(12) United States Patent
Komeyama et al.

(10) Patent No.: US 7,163,461 B2
(45) Date of Patent: Jan. 16, 2007

(54) CROSS JOINT

(75) Inventors: Nobuo Komeyama, Nara (JP); Mitsumasa Ozeki, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/660,754

(22) Filed: Sep. 12, 2003

(65) Prior Publication Data

US 2004/0053700 A1    Mar. 18, 2004

(30) Foreign Application Priority Data

Sep. 13, 2002    (JP) ............... P.2002-268761

(51) Int. Cl.
*F16D 3/40* (2006.01)
(52) U.S. Cl. .................. 464/136; 464/902
(58) Field of Classification Search ......... 464/128, 464/130, 136, 902; 492/1, 3; 72/252.5; 29/90.01
See application file for complete search history.

(56) References Cited

U.S. PATENT DOCUMENTS

| | | | |
|---|---|---|---|
| 1,630,898 A | * | 5/1927 | Laughlin ............ 464/136 X |
| 3,039,183 A | * | 6/1962 | Laster ............... 464/128 X |
| 3,655,466 A | * | 4/1972 | Ostrovsky et al. |
| 4,090,796 A | * | 5/1978 | Okuda et al. ......... 464/128 X |
| 4,869,616 A | * | 9/1989 | Linnemeier ........... 464/136 X |
| 5,538,473 A | | 7/1996 | Busch et al. |
| 6,390,924 B1 | * | 5/2002 | Yoshida et al. ........ 464/902 |

FOREIGN PATENT DOCUMENTS

| | | |
|---|---|---|
| GB | 832 784 A | 4/1960 |
| GB | 2.117.088 A | 10/1983 |

OTHER PUBLICATIONS

European Search Report dated Nov. 27, 2003.

* cited by examiner

*Primary Examiner*—Greg Binda
(74) *Attorney, Agent, or Firm*—McGinn IP Law Group, PLLC

(57) ABSTRACT

In a cross joint (1) outwardly fitting a bearing cup (outer ring member 4) to each of four pieces of shafts 2*b* of a cross shaft member (2) via a cylindrical member (rolling member 3), race portions (2*c*, 4*a*) formed on a side of the cross shaft member (2) and on a side of the bearing cup (4) and a shoulder portion (2*d*) provided between respectives of neck portions of two of the shafts (2*b*) of the cross shaft member (2) contiguous to each other are subjected to roller burnishing.

21 Claims, 3 Drawing Sheets

CROSS JOINT

BACKGROUND OF THE DISCLOSURE

The present invention relates to a cross joint (joint cross coupling, universal joint) used in a steel rolling mill or the like.

In, for example, a steel rolling mill, a cross joint is interposed between a roll and a drive shaft for driving to rotate the roll, a steel rolling processing of the steel material can be carried out by rotating to move the role in accordance with rotation of the shaft while the roll is allowed to move in an up and down direction relative to a steel material which is being rolled. The cross joint includes: a cross shaft member (cross) having four shafts arranged in a cross-like shape; and a cross bearing which has a plurality of cylindrical rollers as rolling members aligned at surroundings of the respective shafts of the member, and a bearing cup as an outer ring mounted to an outer side of outer peripheries of the rollers. Each of outer peripheral portions of the shafts is used as an inner ring race portion. Further, according to the cross joint, the roll and the drive shaft are connected to a first shaft and a second shaft comprising respective pairs of shafts arranged on straight lines in the four shafts respectively via the cross bearings and (rotational) torque from the shaft is transmitted to the roll via the cross joint.

Meanwhile, according to the above-described conventional cross joint, such a cross shaft member and the bearing cup are provided, which are generally constituted by bearing steel of carburized steel or the like.

However, when large torque acts on the cross joint such as in the steel rolling mill, the joint is used under a very severe condition and there is a concern that even when the bearing steel is used, malfunction is brought about at an early stage. In details, the cylindrical roller is rolled on the inner ring race portion or the like formed at the cross shaft member under high contact surface pressure and therefore, exfoliation is liable to be brought about at the race portion. Further, according to the cross member, since the roll and the drive shaft are respectively connected to the contiguous pairs of shafts and therefore, large bending stress may be operated to a shoulder portion between shaft root (shaft neck) portions thereof and fatigue breaking of bending fatigue breaking or the like is liable to be brought about at the member.

SUMMARY OF THE INVENTION

In view of the above-described conventional problem, it is an object of the invention to provide a cross joint capable of prolonging rolling fatigue life of a rolling portion (life of rolling bearing), capable of increasing a fatigue strength of the cross joint and therefore, capable of achieving long life formation (ling fatigue life).

In order to solve the aforesaid object, an exemplary embodiment of the invention has a cross joint with a cross shaft member including four shafts, each having a neck portion and a race portion, and shoulder portions between two neck portions, rolling members adapted to rotate around the race portions, and bearing cups fitted to the respective shafts via the rolling members. The race portions and the shoulder portions are subjected to roller burnishing.

In another exemplary embodiment of the invention, a race portion on the bearing cups is subjected to roller burnishing.

In a further exemplary embodiment of the invention, a residual compressive stress at a depth of approximately 0.3 mm from each of the surfaces of the race portions and the shoulder portions subjected to the roller burnishing is equal to or larger than 800 Mpa.

In yet another exemplary embodiment of the invention, the cross shaft member and the bearing cup includes a carbon steel having a carbon content equal to or larger than 0.42 weight %.

In another exemplary embodiment of the invention, a method of manufacturing a cross joint which includes a cross shaft member including, four shafts, each having a neck portion and a race portion, and shoulder portions between two neck portions, rolling members adapted to rotate around the race portions, and bearing cups fitted to the respective shafts via the rolling members. The method includes subjecting the race portions and the shoulder portions to roller burnishing.

In a further exemplary embodiment of the invention, a method includes subjecting a race portion formed on a bearing cup to roller burnishing.

According to the above-described cross joint, by subjecting the race portion and the shoulder portion of the cross shaft member to roller burnishing, the hardness of each of surfaces of the race portion and the shoulder portion can be increased and a residual compressive stress immediately below the surface can be increased. Further, a roughness of each of the surfaces can also be decreased.

According to the cross joint, the hardness of the surface of the race portion of the outer ring member can be increased and the residual compressive stress immediately below the surface can also be increased. Further, the roughness of the surface can also be decreased.

According to the cross joint, in comparison with the above-described conventional product, the fatigue strength of the race portion and the shoulder portion can further effectively be increased.

According to the cross joint, the fatigue strength substantially comparable to that of the conventional bearing steel can be achieved.

DETAILED DESCRIPTION OF PREFERRED EMBODIMENTS

A preferable embodiment showing a cross joint of the invention will be explained in reference to the drawings as follows. Further, in the following explanation, an explanation will be given of a case of applying the invention to a cross joint for driving a roll integrated into a steel rolling mill.

Figure 1:
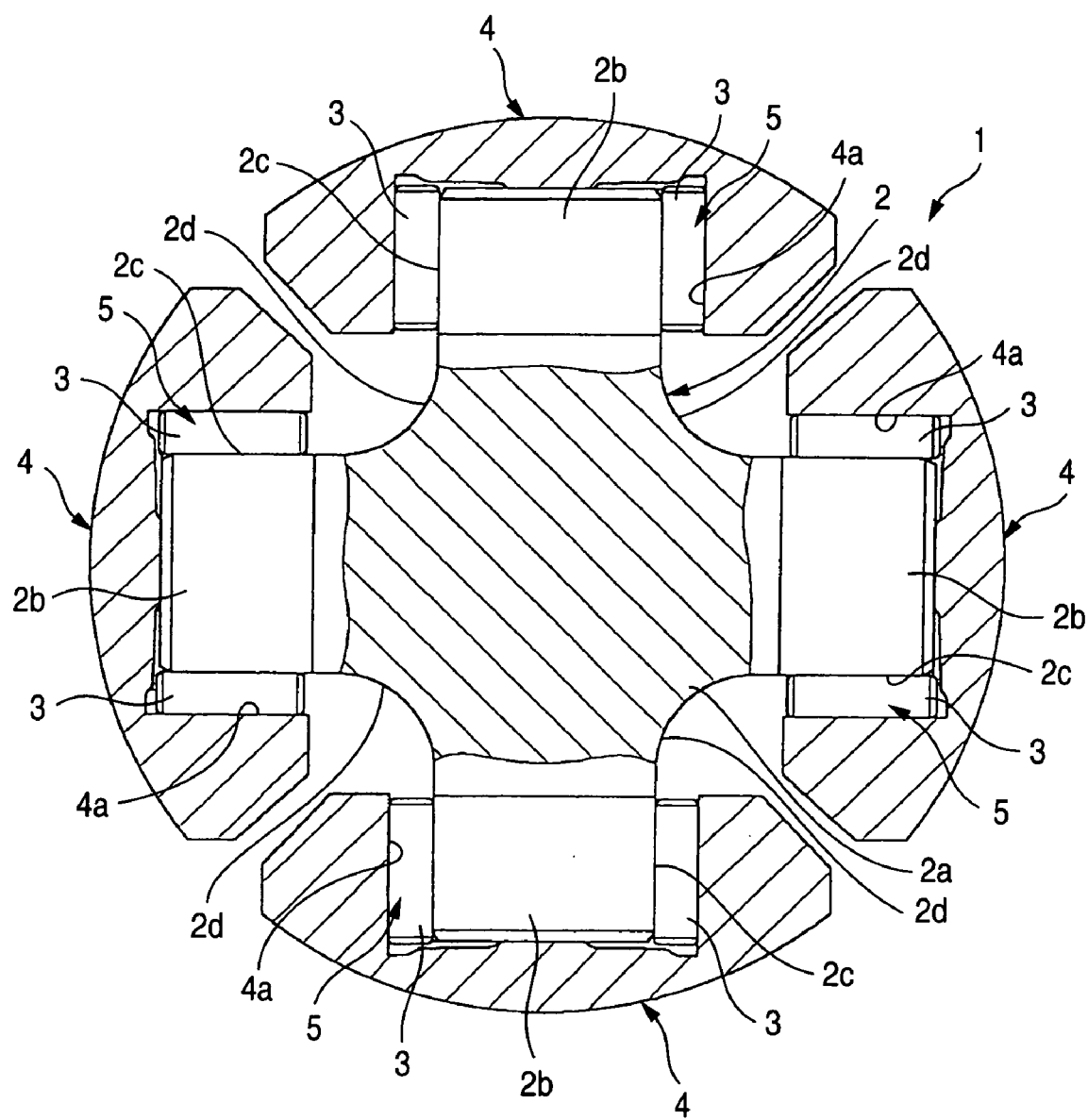
FIG. 1 is an outline sectional view showing an essential portion of a cross joint according to an embodiment of the invention.

FIG. 1 is an outline sectional view showing an essential portion of a cross joint according to an embodiment of the invention. In the drawing, a cross joint 1 according to the embodiment is provided with a cross shaft member 2 integrally constituted with a base portion 2a and four shafts 2b arranged to project from the base portion 2b in a cross-like shape, and roller bearings 5 each having a bearing cup 4 as an outer ring member outwardly fitted to an outer side of an outer periphery of each of the shafts 2b via cylindrical rollers 3.

The outer peripheral portions of the respective shafts 2b of the cross shaft member 2 are formed with inner ring race portions 2c with which the cylindrical rollers 3 are brought into rolling contact and the respective shafts 2b of the member 2 are made to function as inner ring members of corresponding ones of the roller bearings 5. The base portion 2a of the cross shaft member 2 is provided with shoulder portions 2d each having a section in a round-shape in which a center of a radius of curvature is set to an outer side of the base portion 2a and a center portion thereof is recessed to a side of a center portion of the base portion 2a, at respective intervals between Decks (shaft necks) of two of the shafts 2b contiguous to each other. An inside of the roller bearing 5 is constituted to be able to be hermetically sealed by attaching a seal member in a ring-like shape (not illustrated) to the shoulder portion 2d.

The bearing cup 4 is provided with an outer ring race portion 4a and the cylindrical rollers 3 are rolled at inside of the cup 4. Further, the bearing cups 4 are attached to the roll or the drive shaft such that the roll of the steel rolling mill and the drive shaft are respectively connected to horizontal shafts and vertical shafts of the cross shafts comprising two pairs of the shafts 2b respectively aligned linearly (not illustrated). Rotation of the shaft is transmitted to the roll to rotate it in a state that the cross joint permits the roll to rock relative to the shaft axis. Further, the bearing cup 4 is provided with a grease nipple (not illustrated) and grease can pertinently be supplied to portions of the cylindrical rollers 3 rolling on the respective race portions 2c and 4a.

Further, other than the above-described explanation, in place of the cylindrical roller 3, a needle-shape needle roller can also be used as a rolling member rolling between the respective race portions 2c and 4a.

The cross shaft member 2 and the bearing cup 4 are constituted by using bearing steel or the like or a steel material which is carburized or carbonitride by subjecting the material steel to high-frequency quenching or the like. Further, the race portion 2c and the shoulder portion 2d of the cross shaft member 2 and the race portion 4a of the bearing cup 4 are finished to predetermined accuracy by being subjected to finishing by cutting, machining, grinding or polishing.

Further, the race portions 2c and 4a and the shoulder portion 2d are subjected to roller burnishing (deep rolling) after the finishing. According to the roller burnishing, while a mirror finish ball (minor finished surface ball) made of ceramics held by, for example, hydraulic pressure is pressed to a surface of a working portion 2c, or the like, to bring into rolling contact therewith by strong pressure, the mirror finish ball is moved on the surface of the working portion. According to the roller burnishing, working conditions of an amount of burnishing, press force and the like are selected such that, for example, hardness at a depth of up to 0.4 mm from the surface of the working portion is work-hardened to be equal to or larger than Hv 700 and a residual compressive stress at a depth of up to 0.3 mm from the surface of the working portion becomes equal to or larger than 800 Mpa.

As clearly illustrated by FIG. 1, an exemplary embodiment of the cross-shaft includes a round-shaped section (shoulder 2d) with a center of curvature (not shown) that is at an outer side of the cross shaft member.

Further, FIG. 1 clearly illustrates that the round-shaped section (shoulder 2d) does not include a concave angled corner.

Figure 2:
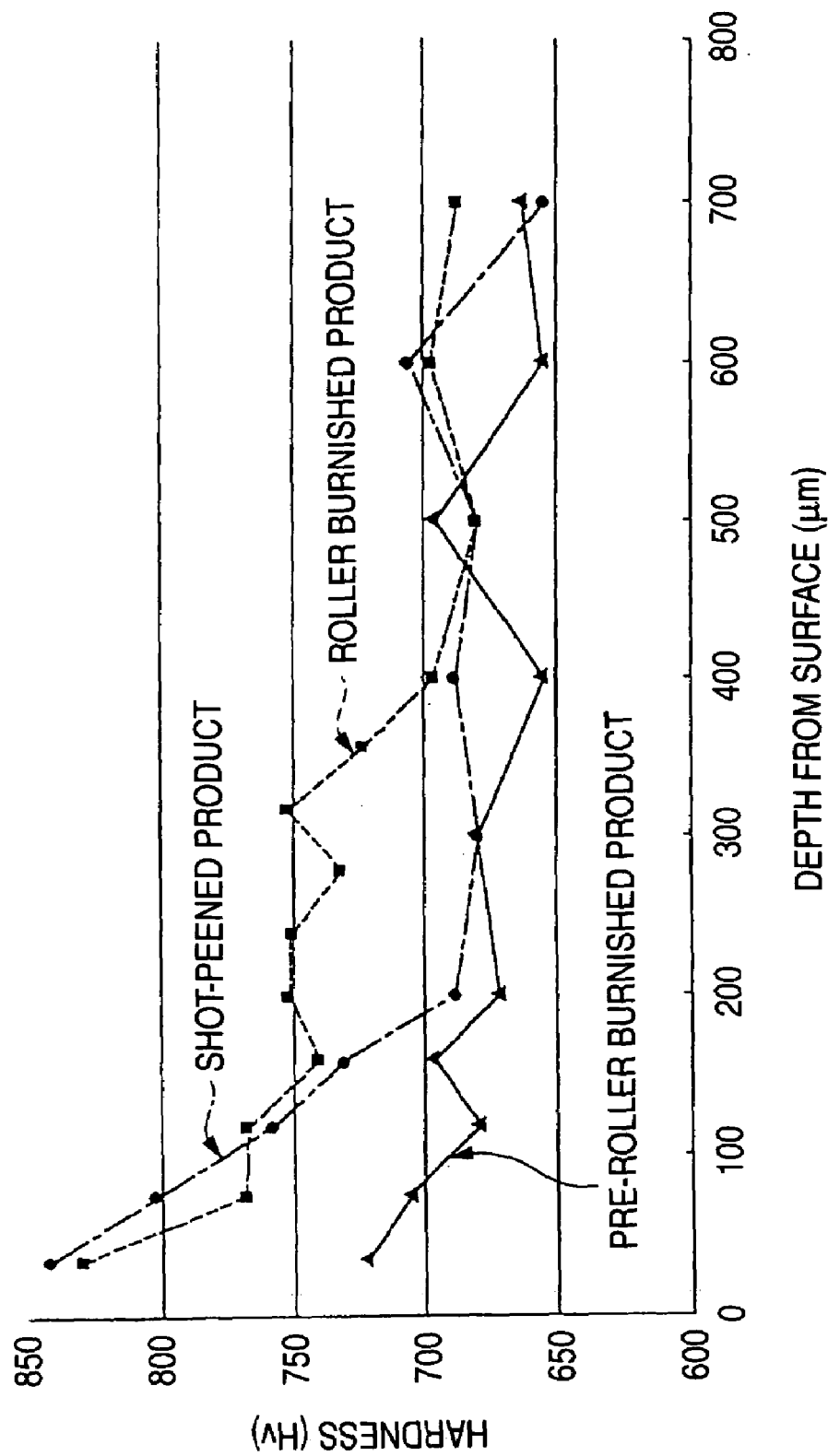
FIG. 2 is a graph diagram showing a result of measuring a hardness at each depth from a surface of a race portion.
Figure 3:
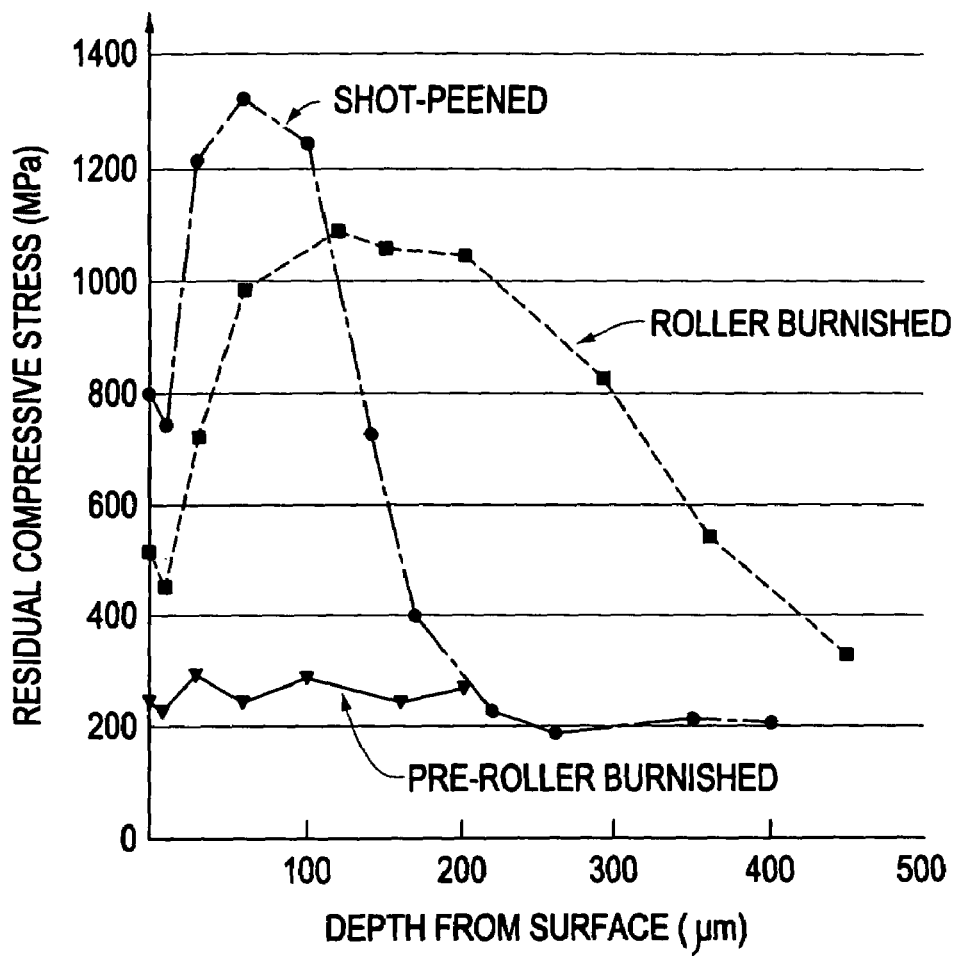
FIG. 3 is a graph diagram showing a result of measuring a residual compressive stress at each depth from the surface of the race portion.

Here, a specific explanation will be given of operation and effect of the roller burnishing in reference to FIG. 2 and FIG. 3 showing an example of a result of a verifying test which has been carried out by the inventors of the invention. Further, in the following explanation, an explanation will be given by exemplifying a verified result at the race portion 2c on the side of the cross shaft member 2 and a mention will also be given of a measured result of a material only subjected to a carburizing treatment before roller burnishing and a material subjected to shot peening in addition to the carburizing treatment for comparison.

As has been apparent from FIG. 2, each race portion 2c after roller burnishing is ensured with a hardness equal to or larger than Hv700 at a depth of un to about 0.4 mm from the surface and is considerably harder than a product before roller burnishing and a shot-peened product. Further, at a depth less than 0.1 mm from surface, the surface hardness of the shot-peened product is more or less harder than that of each roller burnished race portion 2c, the shot-peered product is deteriorated in the surface roughness after working (the surface is roughened) and needs postworking for smoothing the surface for making the cylindrical roller 3 roll in an oil-lubricated state. Specifically, according to the shot-peened product, it is necessary to remove a surface layer thereof at a depth of about 0.05 mm from the surface by the postworking.

In contrast thereto, according to each roller burnished race portion 2c, since the surface is pressed by point contact with the mirror finish ball in roller burnishing, the surface hardness can be hardened while improving (reducing) the surface roughness by smoothly deforming the surface, and contrary to the shot-peered product, it is not necessary to subject the surface to postworking. Therefore, the surface hardness of each race portion 2c is substantially harder than that of the shot-peened product. Further, according to a test by the inventor of the present invention, it has been confined that the surface roughness of each race portion 2c by roller burnishing can be made to be equal to or less than a half of that before working in a maximum height roughness (Rmax) and a surface hardening coefficient can be increased compared with that before working. In this way, the fatigue strength of the race portion 2c can be increased by improving the surface hardening coefficient of the race portion 2c and increasing the surface hardness and surface originated flaking (surface layer flaking) at the race portion 2c can effectively be restrained from being brought about.

Further, as shown in FIG. 3, at each race portion 2c, a residual compressive stress equal to or larger than 800 MPa is generated at a depth of up to 0.3 mm from the surface and work hardening is produced up to a depth about twice as much as that of the short-peened product.

FIG. 3 also illustrates that a residual compressive stress at a depth of approximately 0.1 mm from the roller burnished surface is larger than a residual compressive stress a depth of less than approximately 0.1 mm from the roller burnished surface, a residual compressive stress at a depth of approximately 0.2 mm from the roller burnished surface is larger than a residual compressive stress a depth of greater than approximately 0.2 mm from the roller burnished surface, and a residual compressive stress at a depth of approximately 0.01 mm from the roller burnished surface is less than a residual compressive stress at a depth of aproximately 0.3 mm from the roller burnished surface.

By producing the large residual compressive stress at the race portion 2c in this way, inner portion originated flaking at the race portion 2c can effectively be restrained from being brought about and the fatigue strength against stresses generated at inside of the race portion 2c can be increased. That is, at the shoulder portion 2d subjected to roller burnishing, the fatigue strength against bending stress operated by two of the shafts 2b continuous to the shoulder portion 2d can be increased and the bending fatigue breaking (fracture) can effectively be restrained from being brought about.

As described above, according to the cross joint 1 according to the embodiment, by subjecting the race portions 2c and 4a provided at the cross shaft member 2 and the bearing cup (outer ring member) 4 and the shoulder portion 2d of the cross shaft member 2 to roller burnishing, while improving roughnesses of the respective surfaces of the race portions 2c and 4a and the shoulder portion 2d, the surface harnesses can be increased and the residual compressive stresses immediately below the surfaces can be increased. As a result, in comparison with the conventional product which is not subjected to roller burnishing, exfoliation life of the race portions 2c and 4a can be prolonged and the fatigue strength of the race portions 2c and 4a and the shoulder portion 2d can be increased and therefore, long life formation of the cross joint 1 can be achieved. Further, since the cross joint 1 is provided with the race portions 2c and 4a having long flaking life (life of rolling bearing) and provided with the cross shaft member 2 and the bearing cup 4 having excellent fatigue strength, a cross joint used under a very severe condition by being integrated to a transmitting mechanism for transmitting high torque from a drive shaft to a driven shaft can simply be constituted.

Further, according to the embodiment, the residual compressive stress at the depth of up to 0.3 mm from the respective surfaces of the race portions 2c and 4a and the shoulder portion 2d is made to be equal to or larger than 800 MPa and therefore, in comparison with the above-described conventional product, the fatigue strength of the race portions 2c and 4a and the shoulder portion 4d can effectively be increased.

Further, although according to the above-described explanation, an explanation has been given of a case of applying to the cross joint integrated into the steel rolling mill, the invention is not limited thereto but is applicable to various kinds of cross joints (universal joints) connected to, for example, a propeller shaft of an automobile and the like.

Further, although according to the above-described explanation, an explanation has been given of the constitution in which the center of the radius of curvature is sct on the outer side of the base portion 2a and the shoulder portion 2d having the section in the round-shape in which the central portion is recessed to the side of the center portion of the base portion 2a is subjected to roller burnishing, according to the invention, each shoulder portion between two of the shaft neck portions of the cross shaft member (cross or spider) phases of which are shifted from each other by 90 degrees may be subjected to roller burnishing and the shape of the shoulder portion is not limited to the above-described at all. Specifically, there may be constructed a constitution in which a shoulder portion having a section in a linear shape or a shoulder portion having a section in a round shape in which the center of a radius of curvature is set to a center side portion of a base portion such that a central portion thereof bulges to an outer side of the base portion is subjected to roller burnishing.

Further, although according to the above-described explanation, an explanation has been given of a case of constituting the cross shaft member 2 and the bearing cup 4 by using bearing steel, the invention is not limited thereto but there may be constructed a constitution in which a cross shaft member, a bearing cup, or the like is constituted by carbon steel having a carbon content of, for example, 0.42 weight % or more, br a steel material hardened to a hardness of about HRC55 by subjecting the material steel to a heat treatment or a high-frequency quenching treatment and the race portion and the shoulder portion is subjected to roller burnishing. By using carbon steel for mechanical structure in this way, a cross shaft member having a fatigue strength substantially comparable to that of the conventional product comprising bearing steel and restraining material lost can easily be constituted and the cross joint can be fabricated at low cost.

The invention constituted as described above achieves the following effects.

According to the cross joint of the invention, by subjecting the race portion and the shoulder portion of the cross shaft member to roller burnishing, the hardness of each of the surfaces of the race portion and the shoulder portion is increased and the residual compressive stress immediately before the surface is increased and therefore, in addition to that the roughness of each of the surfaces can be decreased, in comparison with the conventional product which is not subjected to roller burnishing, exfoliation life of the race portion can be prolonged, the fatigue strength of the cross shaft member can effectively be increased and therefore, long life formation of the cross joint can be achieved.

Further, according to the cross joint of the invention, by subjecting the race portion of the outer ring member to roller burnishing, the hardness of the surface of the race portion is increased, the residual compressive stress immediately below the surface is increased and therefore, in addition to that the roughness of the surface can be increased, in comparison with the conventional product which is not subjected to roller burnishing, the exfoliation life of the race portion can be prolonged.

Further, according to the cross joint of the invention, in comparison with the conventional product, the fatigue strength of the race portion and the shoulder portion can further effectively be increased and long life formation of the cross joint can further effectively be achieved.

Further, according to the cross joint of the invention, the life substantially comparable to that of the cross joint comprising bearing steel can be ensured by an inexpensive material.

What is claimed is:

1. A cross joint comprising:
   a cross shaft member comprising:
      four shafts each comprising a neck portion and a race portion; and
      shoulder portions between adjacent neck portions;
   rolling members adapted to rotate on the race portions; and
   bearing cups fitted to the respective shafts via the rolling members,
   wherein a round-shaped section of at least one of said shoulder portions has a center of curvature at an outer side of the cross shaft member,
   wherein the round-shaped section does not include a concave angled corner,
   wherein the shoulder portions are subjected to roller burnishing for increasing a hardness of each surface of the shoulder portions and for increasing a residual compressive stress immediately below each of said surfaces, and
   wherein a residual compressive stress at a depth of up to 0.3 mm from each of surface of the shoulder portions subjected to roller burnishing is larger than a residual compressive stress at the deeper portions thereof.

2. The cross joint according to claim 1, wherein a race portion formed on at least one of the bearing cups is subjected to roller burnishing.

3. The cross joint according to claim 1, wherein the cross shaft member comprises a carbon steel.

4. The cross joint of claim 3, wherein the carbon steel comprises a carbon content equal to or larger than 0.42% by weight.

5. The cross joint of claim 1, wherein at least one of said rolling members comprises a cylindrical roller.

6. The cross joint of claim 1, wherein at least one of said rolling members comprises a needle roller.

7. The cross joint of claim 1, wherein one of said shoulder portions comprises a hardness approximately equal to or larger than Hv700 from a surface to at least a depth of approximately 0.2 millimeters.

8. The cross joint of claim 7, wherein at least one of said shoulder portions comprises a hardness approximately equal to or larger than Hv700 from a surface to up to a depth of approximately 0.4 millimeters.

9. The cross joint of claim 1, wherein the bearing cups comprise a carbon steel.

10. The cross joint of claim 9, wherein the carbon steel comprises a carbon content equal to or larger than 0.42% by weight.

11. The cross joint of claim 1, wherein
the race portions are subjected to the roller burnishing for increasing a hardness of each surface of the race portions and for increasing a residual compressive stress immediately below each of said surfaces, and
a residual compressive stress at a depth of up to 0.3 mm from each of the surfaces of the race portions subjected to the roller burnishing is larger than a residual compressive stress at a deeper portion thereof.

12. The cross joint of claim 11, wherein
the roller burnishing of the race portion increases a surface hardness of the race portion, and
at least one roller-burnished race portion comprises a hardness approximately equal to or larger than Hv700 from a surface to at least a depth of approximately 0.2 millimeters.

13. The cross joint of claim 12, wherein the at least one roller-burnished race portion comprises a hardness of approximately equal to or larger than Hv700 from a surface to up to a depth of approximately 0.4 millimeters.

14. The cross joint of claim 11, wherein a residual compressive stress at a depth of 0.25 mm from each of the surfaces of the shoulder portions subjected to the roller burnishing is larger than 800 Mpa.

15. The cross joint of claim 14, wherein the residual compressive stress at the depth of approximately 0.3 mm from each of the surfaces of the race portions subjected to the roller burnishing is equal to or larger than 800 MPa.

16. The cross joint of claim 1, wherein a residual compressive stress at a depth of 0.25 mm from each of the surfaces of the shoulder portions subjected to the roller burnishing is larger than 800 Mpa.

17. The cross joint according to claim 16, wherein a residual compressive stress at a depth of approximately 0.3 mm from each of surfaces of the shoulder portions subjected to the roller burnishing is equal to or larger than 800 MPa.

18. The cross joint of claim 1, wherein a residual compressive stress at a depth of approximately 0.1 mm from the roller burnished surface is larger than a residual compressive stress a depth of less than approximately 0.1 mm from the roller burnished surface.

19. The cross joint of claim 1, wherein a residual compressive stress at a depth of approximately 0.2 mm from the roller burnished surface is larger than a residual compressive stress a depth of greater than approximately 0.2 mm from the roller burnished surface.

20. The cross joint of claim 1, wherein a residual compressive stress at a depth of approximately 0.01 mm from the roller burnished surface is less than a residual compressive stress at a depth of approximately 0.3 mm from the roller burnished surface.

21. A cross joint comprising:
a cross shaft member comprising:
four shafts each comprising a neck portion and a race portion; and
shoulder portions between adjacent neck portions;
rolling members adapted to rotate on the race portions; and
bearing cups fitted to the respective shafts via the rolling members,
wherein a round-shaped section of at least one of said shoulder portions has a center of curvature at an outer side of the cross shaft member,
wherein the round-shaped section does not comprise a concave angled corner, and
wherein a residual compressive stress at a depth of to 0.3 mm from each surface of the race portions and the shoulder portions subjected to the roller burnishing is equal to or larger than 800 Mpa.

* * * * *